United States Patent Office 2,983,544
Patented May 9, 1961

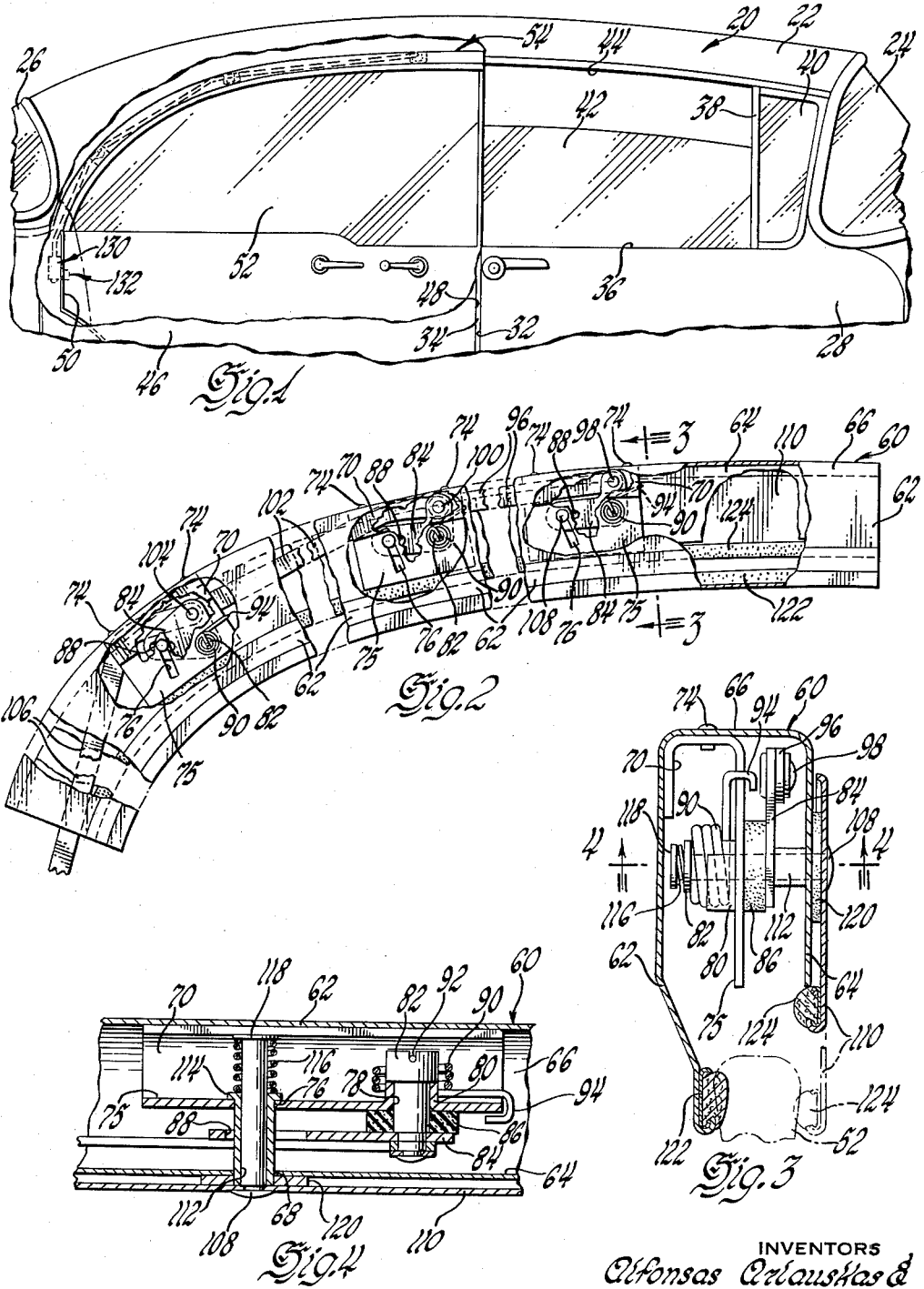

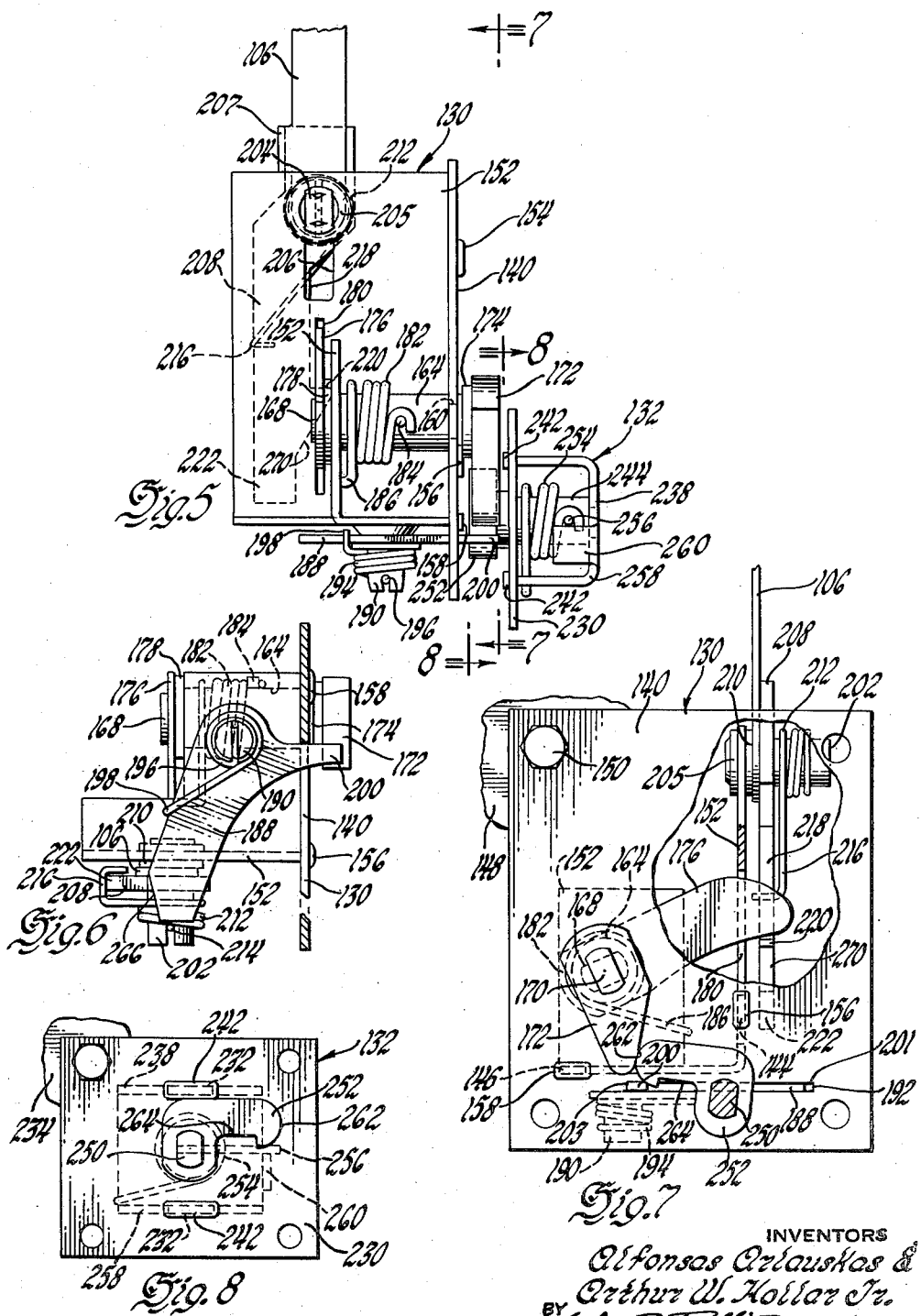

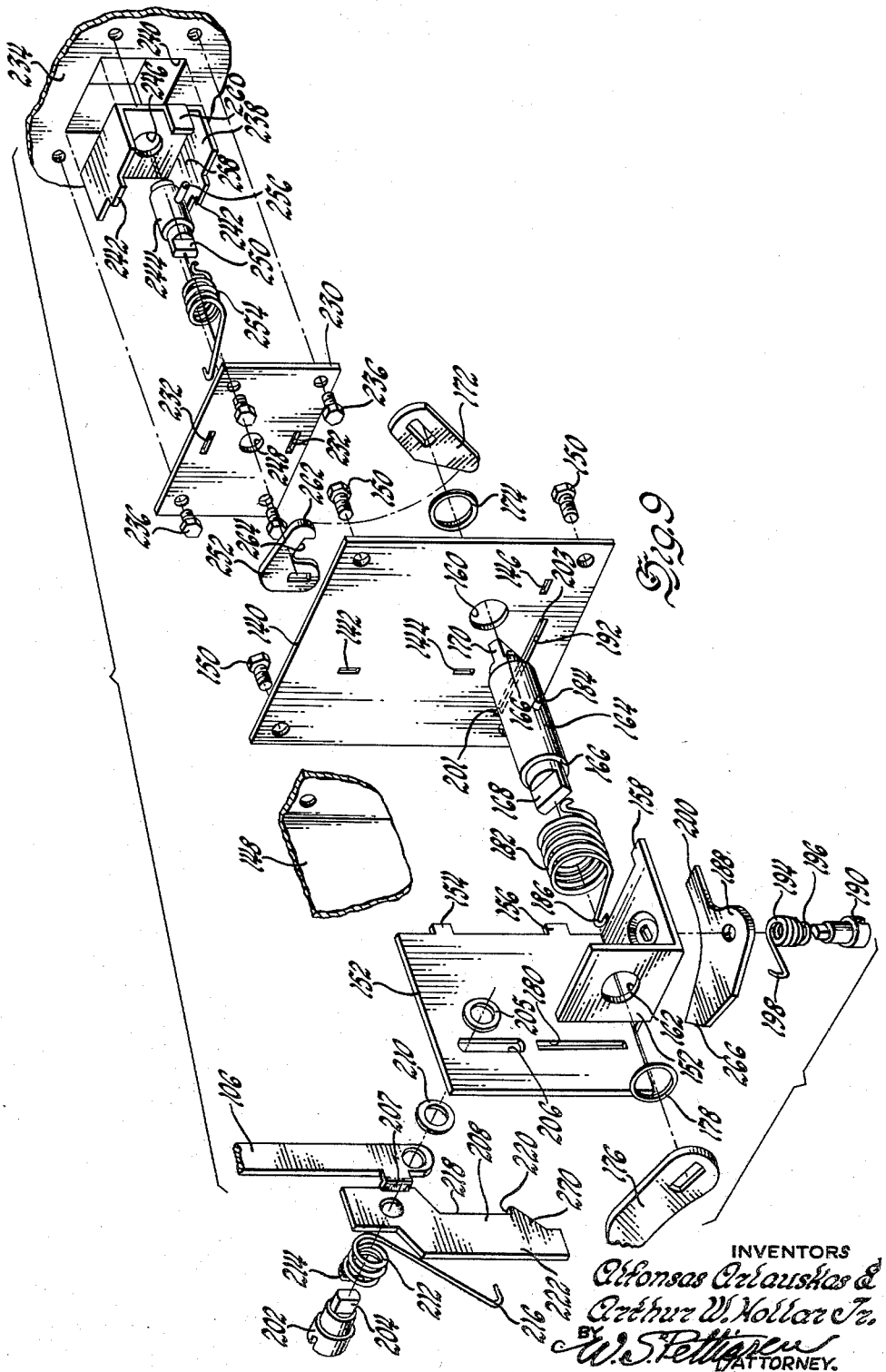

2,983,544

FINISH MOLDING FOR AUTOMOBILE BODIES

Alfonsas Arlauskas, Detroit, and Arthur W. Hollar, Jr., Grosse Pointe Woods, Mich., assignors to General Motors Corporation, Detroit, Mich., a corporation of Delaware Filed Dec. 28, 1956, Ser. No. 631,309

9 Claims. (Cl. 296—44.5)

This invention relates to finish moldings for automobile bodies and more particularly to finish moldings for automobile bodies of the type including a swingable door and a door window moving generally vertically between open and closed positions with respect to a door header.

In automobile bodies of the four-door hard top sedan type, there is no door window frame structure above the body belt line, except for the ventilation window frame at the forward portion of the front door. Both the front and rear doors support door windows which move generally vertically between open and closed positions with respect to the door header which is part of the roof rail structure of the body. Thus, a continuous window opening is provided from the rear quarter area of the body to the front door ventilation window frame when the front and rear door windows are in open position.

The finish molding for the front door may be provided by a hinged finish molding of the type shown in Wernig, 2,631,887, or Bratton et al., 2,649,329, since this type of finish molding is actuated by the ventilation window frame of the front door. However, finish moldings of this type cannot be used for the rear door window since there is no rear door window frame structure above the belt line. Thus, there is a definite problem in providing a finish molding for the rear door windows of such bodies since the molding must provide a glass receiving channel for the upper edge portion of the window in closed position and yet allow the door to be moved between open and closed positions when the window is in closed position.

This invention provides such a finish molding particularly intended for use with the rear door windows of four-door hard top sedans. The finish molding of this invention provides a glass receiving channel for the upper edge portion of the rear door window in the closed position thereof and yet allows the rear door to be moved between open and closed positions regardless of the position of the rear door window. The finish molding may be used in conjunction with the hinged type of finish molding to provide a continuous finish molding for both the front and rear doors of the body or the finish molding of this invention may be used with equal success for both the front and rear doors of the body.

The primary object of this invention is to provide an improved finish molding for automobile bodies of the type including a swingable door and a door window movable vertically between open and closed positions. Another object of this invention is to provide a finish molding for automobile bodies of the four-door hard top sedan type which provides a glass channel for receiving the upper edge portion of the door window and yet which allows the door to be moved between open and closed positions regardless of the position of the window. A further object of this invention is to provide a finish molding for automobile bodies of the type including a door swingable to open and closed positions and having no door structure above the body belt line and a door window movable generally vertically between open and closed positions with respect to a door header.

These and other objects of this invention will be readily apparent from the following specification and drawings, in which:

Figure 1 is a partial side elevational view of an automobile body of the four-door hard top sedan type embodying a finish molding according to this invention for the rear door window;

Figure 2 is an enlarged view of the finish molding of Figure 1 with parts thereof broken away for clarity of illustration;

Figure 3 is an enlarged sectional view taken on the plane indicated by line 3—3 of Figure 2;

Figure 4 is a sectional view taken on the plane indicated by line 4—4 of Figure 3;

Figure 5 is a view of the latch and trigger mechanism which coordinates movement of the door with movement of the finish molding;

Figure 6 is a bottom plan view of the latch mechanism of Figure 5;

Figure 7 is a view taken on the plane indicated by line 7—7 of Figure 5, with parts thereof broken away for clarity of illustration;

Figure 8 is an elevational view of the trigger mechanism which is mounted on the rear door taken on line 8—8 of Figure 5; and Figure 9 is an exploded view of both the latch and trigger mechanism.

Referring now to Figure 1 of the drawings, an automobile body 20 of the four-door hard top sedan type includes a roof 22 terminating along either side thereof in a roof rail (not shown) of known construction, a windshield 24, and a backlite 26. The front door 28 of the body is hinged at its forward edge in a suitable manner to the body and is latched at its rearward edge 32 on a center pillar 34 which extends only to the belt line 36 of the body. A ventilation window frame 38 at the forward portion of the front door pivotally supports a ventilation window 40 which is movable between open and closed positions. The front door window 42 is movable generally vertically between open and closed positions with respect to the door header 44 which is provided by the roof rail of the body. Although no finish molding for the front door window 42 is shown, a hinged finish molding of the type shown in Wernig, 2,631,887, or Bratton et al., 2,649,329, may be used or a finish molding of the type provided for this invention may be used.

The rear door 46 of the body is hinged at its forward edge 48 to pillar 34 and latched at its rearward edge 50 to the body. A rear door window 52 is supported by the door and is movable generally vertically between open and closed positions with respect to the door header 44. Thus, as can be seen, there is no door window structure provided above the belt line 36 except for the ventilation window frame 38 of the front door. When both the front and rear door windows are in open position, a continuous window opening is provided between the rear quarter area of the body and the ventilation window frame.

In present production four-door hard top sedan bodies, no finish molding has as yet been provided for the rear door window 52 because of the problems involved in providing such a finish molding which will receive the upper edge portion of the window in the closed position thereof and which will allow the rear door to be moved to open position when the window is in closed position. Although a finish molding of the hinged type could be used for the front door window 42, no such molding has been provided due to the discontinuity of appearance which would result. This invention provides a finish molding generally designated as 54 for the rear door window which provides a glass receiving channel for the upper edge portion of the rear door window in the closed position thereof and which is coordinated with opening and closing movement of the rear door 46 so as to allow the door to be moved to either position thereof without interference with the finish molding regardless of the position of the rear door window.

Referring now to Figures 2, 3, and 4 of the drawings, the finish molding will be described. A channel member 60 of a longitudinal shape conforming to the contour of the rear portion of the door header 44 includes inboard and outboard legs 62 and 64, respectively. Although not shown in the drawings, it is intended that the channel member be received within a downwardly opening channel in the roof rail header so as to house the major portion of the finish molding. However, the channel member 60 may also have its base wall 66 secured directly to the surface of the door header if desired. Either manner of mounting the channel member 60 to the door header may be used with equal success.

A number of like forwardly and downwardly angled slots 68 are provided in the outboard leg 64 of channel member 60. A bracket 70 has its base secured to the base 66 of channel member 60 by rivets 74, with one of the brackets being provided adjacent each of the slots 68 in the outboard leg of the channel member. The outboard leg 75 of each of the brackets is provided with a slot 76 which is aligned with the slot 68 in leg 64. An opening 78 is further provided forwardly of slot 76 in the outboard leg 75 of each of the brackets 70 and the metal of the opening is displaced inwardly to provide a boss 80. A shouldered stud 82 extends outwardly through each of the openings 78, with the head of the stud engaging the edge of boss 80. A bell crank 84 is fixedly secured in a suitable manner to each stud 82, with an antifriction washer 86 being provided between the bell crank and the outboard leg 75 of bracket 70.

As can be seen particularly in Figure 2, one leg of each of the bell cranks is provided with a slot 88 which is located generally angular to the slots 68 and 76, respectively, in the outboard leg 64 of channel member 60 and the outboard leg 75 of bracket 70. A coil torsion spring 90 has one end 92 thereof fixed within the slotted head of each stud 82 and the other end 94 thereof engaging the forward edge of the outboard leg 75 of bracket 70 in order to bias the bell crank 84 in a clockwise direction as viewed in Figure 2. The bell cranks 84 are interconnected by shiftable links, with a link 96 being pivotally secured to the forward bell crank at 98 and to the intermediate bell crank at 100; a link 102 also being pivotally secured to the intermediate bell crank at 100 and to the rear bell crank at 104; and a link 106 also being pivotally secured to the rear bell crank at 104. It will be noted that the links are disposed inwardly within the channel member 60 and roughly follow the contour of the base wall 66 of the member.

Three spaced pins 108 are secured to an outer extendible and retractable strip 110 of the finish molding. The pins extend inwardly through the slots 68 in the outboard leg 64 of channel member 60, the slots 88 in the bell cranks 84, and the slots 76 in the outboard leg 75 of each of the brackets 70. A bushing 112 surrounds each of the pins and also extends inwardly through the respective slots, with the inner end 114 of the bushing being flanged over inwardly of the outboard leg 75 of bracket 70 and the outer end of the bushing engaging the inner surface of strip 110. A coil compression spring 116 extends between the inner head 118 of each of the pins and the flange 114 of bushing 112 in order to bias the bushings 112 outwardly and maintain the spatial relationship between the strip 110 and the outboard leg 64 of channel member 60. An anti-friction washer 120 is further provided between strip 110 and the outboard leg 64 to aid in maintaining this relationship at each of the pins 108.

Referring now to Figure 2, the general operation of the finish molding will be described. If the link 106 is moved downwardly, links 96 and 102 will be shifted rearwardly and each of the bell cranks 84 will be moved counterclockwise about its respective pivot provided by stud 82, with this movement being against the action of each of the springs 90. As the bell cranks move counterclockwise, slots 88 in each of the bell cranks will cam pins 108 downwardly and forwardly in slots 68 and 76 so that the outer strip 110 will be moved downwardly and forwardly to a position indicated schematically at 110 in Figure 3 wherein the outer strip is located in opposition to the inboard leg 62 of member 60 to provide a rear door window glass receiving channel. As can be seen in Figure 3, the inboard leg 62 of member 60 mounts a weather strip 122, with a similar weather strip 124 being mounted on the outer strip 110. When the strip 110 is in its extended or lowered position, the strip is located outboard of the rear door window 52, with the weather strips on strip 110 and leg 62 being located in opposition to each other to seal the inner and outer upper edge portions of the rear door window 52 when this window is in closed position as shown schematically in Figure 3.

Similarly if link 106 is released, links 96 and 102 will be shifted forwardly as each of the springs 90 acts to swing the bell cranks 84 in a clockwise direction so that the slots 88 of the bell cranks will cam pins 108 upwardly and rearwardly within slots 68 and 76 to move the outer strip 110 to its retracted or upper position. Thus, the outer strip 110 is movable between an extended or lower and retracted or upper position. In the extended or lower position, the strip 110 cooperates with channel member 60 in providing a window glass receiving channel for the rear door window 52 when this window is in closed position and door 46 is also in closed position.

Since the outer strip 110 is located outboard of the rear door window 52 when the strip is in its extended or lower position and the door window and door are in closed position, the strip must be coordinated with opening movement of the door so that the strip will be moved to an upper or retracted position simultaneously with initial opening movement of the door to prevent interference between the strip and door. Similarly, when the door is moved to closed position, the strip must be coordinated with closing movement of the door so that the strip will be moved to a lower or extended position substantially at the same time the door reaches its fully closed position.

Referring now particularly to Figures 5 through 9 of the drawings, the mechanism coordinating the movement of the strip with the movement of the door will be described, with the mechanism being shown in the upper or retracted position of strip 110. In general, this mechanism includes a latch mechanism 130 which is carried by the body adjacent the rear door jamb face thereof and a trigger mechanism 132 which is carried by the rear door 46, with the latch and trigger mechanisms being located opposite each other in the closed position of the door.

The latch mechanism will be initially described and includes a plate 140 having slots 142, 144, and 146. This plate is secured to the outer face of the rear door lock pillar of the body, generally designated as 148, by a number of bolts 150 extending inwardly through suitable apertures in the plate and pillar. It will be understood, of course, that an opening is provided in the rear door jamb face and that the plate fits over the opening. A bracket 152 having tabs 154, 156, and 158 is secured to plate 140 by fitting the tabs in slots 142, 144, and 146, respectively, and then peening over the tabs. The brackets extend inwardly of the body and are concealed from view by the plate 140. An opening 160 is provided in plate 140 and a similar opening 162 is provided in bracket 152 in alignment therewith. A shaft 164 having opposite shouldered ends 166 is received within openings 160 and 162 to rotatably mount the shaft on plate 140 and bracket 152. It will be noted that the opposite ends of the shaft terminate in lugs 168 and 170, with these lugs being substantially normal to each other.

A lever 172 having an opening therein of the shape of lug 170 is secured to the lug outboard of plate 140 by peening over the end of the lug after assembly, with an anti-friction washer 174 being provided between the lever and plate 140 for ease of movement of the lever relative to the plate. A detent lever 176 having an opening therein of the shape of lug 168 is fitted over the lug and secured thereto by peening over the end of the lug after assembly, with a washer 178 being provided between the lever and bracket. Lever 176 extends through a slot 180 in bracket and swings upwardly and downwardly within the slot as will be described. A coil torsion spring 182 surrounds shaft 164 intermediate plate 140 and bracket 152 and has one end thereof hooked over a pin 184 fixed to shaft 164 and the other end 186 thereof hooked over an edge of bracket 152, as can be seen in Figure 7. The operation of the spring is such as to bias shaft 164 in a counterclockwise direction, as viewed in Figure 7, so that lever 176 will normally be disposed substantially at the upper end of slot 180 and lever 172 will normally be disposed downwardly and outwardly with respect to plate 140 and the jamb face of the body. A lever 188 is pivoted to bracket 152 by a shouldered pin 190 having a lug 191 fixedly received within a similarly shaped opening in the bracket. The lever is swingable in a plane normal to the planes of swinging movement of levers 172 and 176 and extends outwardly through a slot 192 in plate 140. A coil torsion spring 194 surrounds pin 190 and has one end 196 thereof fixed within the slotted head of the pin and the other end 198 thereof hooked to lever 188, as can be seen particularly in Figure 6. Spring 194 acts to swing lever 188 clockwise, as viewed in Figure 6, to maintain the lug 200 of the lever in engagement with the inboard end 203 of slot 192 substantially normal to the outboard surface of plate 140, as can be seen in Figures 5 and 6, and to return lug 200 of the lever to this position if the lug is moved toward the outboard end 201 of slot 192.

A shouldered pin 202 includes a lug 207 at one end thereof which is slidably received within a generally vertical slot 206 in bracket 152, with the lug being peened over a washer 205 after assembly. The lower end of link 106 is provided with a circular opening so as to rotatably mount the link on pin 202 and a laterally outwardly extending lug 207. A detented member or lever 208 having a circular opening is swingably received on pin 202 so as to be movable therewith. The lever is also swingable clockwise relative to the pin, as viewed in Figures 5 and 9, but cannot swing counterclockwise relative to the pin due to engagement of the lever with lug 207 of link 106. Thus, the lower end of link 106 and lever 208 are guided for substantially vertical movement by means of the lug 207 and slot 206. An anti-friction washer 210 fits between the lower end of link 106 and bracket 152, with the washer, link 106, and lever 208 arranged in successive outward relationship to bracket 152, as can be seen in Figure 7. A coil torsion spring 212 encircles pin 202 and has one end 214 thereof fixed within the slotted head of the pin and the other end 216 thereof engaging lever 208 so as to maintain lever 208 in a substantially vertical position in engagement with lug 207 and always return the lever to this position after swinging movement thereof about pin 202. Lever 208 further includes an edge 218 which terminates in a detent shoulder 220. As can be seen particularly in Figures 5 and 7, lever 176 is adapted to swing in a plane substantially parallel with edge 218 and is normally held in engagement with detent shoulder 220 by the action of the coil torsion spring 182 acting on shaft 164.

As has been previously explained, springs 90 act to maintain the outer strip 110 in its upper or retracted position which in turn moves link 106 upwardly so that pin 202 is normally disposed at the upper end of slot 206, as can be seen in Figure 5. Lever 176 is in engagement with shoulder 220 in this position but exerts no downward force on lever 208 since this is the normal position of lever 176, as previously explained. Thus, the outer strip 110 will normally remain in its upper or retracted position. However, should clockwise turning movement be placed on shaft 164, as viewed in Figure 7, lever 176 will swing clockwise and downwardly within slot 180 to move lever 208 and link 106 downwardly as pin 202 moves to the lower end of slot 206. This will swing the bell cranks 84 counterclockwise about the studs 92, as viewed in Figure 2, and move the outer strip 110 to its lower or extended position. Thus, it can be seen that the outer strip 110 is normally biased to its upper or retracted position by may be moved to its lower or extended position by means of the latch mechanism which is designated as 130. When lever 208 is in its lower or downward position, the lug 222 at the lower end of the lever is disposed in the path of clockwise swinging movement of lever 188, as viewed in Figure 6, for a purpose to be described.

The trigger mechanism which controls the latch mechanism and is movable with the rear door 46 will now be described. A plate 230 having slots 232 is secured to the rear wall 234 of the rear door by means of bolts 236. A generally U-shaped housing 238 fits within an opening 240 in wall 234 and includes tabs 242 which are received within slots 232 and are then peened over to secure the housing to the plate. Shaft 244 has the inner end thereof rotatably mounted in an opening 246 in housing 238 and the outer end thereof rotatably mounted in an opening 248 in the plate 232. The outer end of the shaft terminates in a lug 250 which is adapted to receive a similar shaped opening in a trigger 252, with the end of the lug being peened over after assembly in order to secure the trigger to the shaft. A coil torsion spring 254 surrounds shaft 244, with one end of the spring being hooked over a pin 256 extending through the shaft and the other end of the spring being hooked over the lower leg 258 of housing 238. The spring 254 acts to swing trigger 252 in a clockwise direction, as viewed in Figure 8, with pin 256 being engageable with a tab 260 of housing 238 to limit swinging movement of the trigger in this direction. Spring 254 is thus preloaded to maintain the trigger in a generally horizontal position pointing inwardly of the body.

Referring now particularly to Figures 5, 6, and 7 of the drawings, the operation of the latch and trigger mechanisms will be described. These mechanisms are shown in their respective positions when the outer strip 110 is in an upper or retracted position and door 46 is in a partially closed position immediately adjacent its fully closed position. Assuming now that the door is moved to a fully closed position, the trigger 252 will be moved inwardly of the body or to the left, as viewed in Figure 7, so that the cam nose 262 of the trigger will ride up and past lug 200 of lever 188 so that lug 200 will be positioned within the hook 264 of the trigger in the closed position of the door. The cam nose will also engage lever 172 to swing the lever clockwise to a substantially vertical position and hold the lever in this position in the closed position of the door. Clockwise movement of lever 172 will rotate shaft 164 and in turn swing lever 176 downwardly within slot 180 so that lever 176 in turn will move link 106 downwardly as pin 202 slides in slot 206. This will move link 106 downwardly so as to move the outer strip 110 to a lower or extended position as has been previously described, to position the strip outboard of the rear door window 52 and cooperate with leg 62 of member 60 in providing a glass receiving channel. In this position of lever 208, the lug 222 of the lever is located below bracket 152 and in the path of counterclockwise swinging movement of lever 188, as previously explained.

Assuming now that the door is moved from its fully closed position to its fully open position, the trigger 252 will be moved outwardly or to the right, as viewed in Figure 7. As the trigger moves outwardly, it will release lever 172 so as to allow spring 182 to rotate shaft 164 in a counterclockwise direction, as viewed in Figure 7, so as to swing lever 176 upwardly within slot 180. This will start to release the pull down force exerted by lever 176 on lever 208 through shoulder 220 and allow the springs 90 to move lever 208 and link 106 upwardly as the strip 110 starts to move to an upper or retracted position. However, full release of lever 172 from trigger 252 requires more time than is available to move the strip 110 to an upper or retracted position since the strip will not be completely moved to this position until the door is partially open and interference will thus occur between the strip and door. In order to prevent this interference and insure that strip 110 is immediately retracted simultaneously with initial opening movement of door 46, trigger 252 has been provided with the hook 264 to receive lug 200 of lever 188 in the closed position of the door and lever 208 has been provided with lug 222 which is disposed in the path of swinging movement of lever 188 in the closed position of the door. Thus, as the trigger moves outwardly, as previously mentioned, the hook 264 of the lever will swing lever 188 clockwise, as viewed in Figure 6, so that the cam edge 266 of the lever will engage lug 222 of lever 208 and swing lever 208 to the left, as viewed in Figure 5. This will move shoulder 220 out of engagement with lever 176 and allow springs 90 to immediately move lever 208 and link 106 upwardly to in turn move strip 110 to an upper or retracted position simultaneously with initial opening movement of door 46. As lever 208 moves upwardly, lug 222 will be moved out of engagement with lever 188 and spring 212 will return lever 208 to its normal vertical position. As lever 176 continues to move upwardly, it will engage cam edge 270 of the lever to cam lever 208 to the left, as viewed in Figure 5, to allow the lever 176 to again be positioned in engagement with shoulder 220 upon return of lever 208 to its normal position by spring 212. The trigger 252 will also move out of engagement with lug 200 of lever 188 to allow spring 194 to return the lever to its normal position.

Thus, it can be seen that the strip 110 is positively controlled for movement between an upper or retracted position and a lower or extended position and is coordinated with movement of door 46. The movement of the strip to a lower or extended position is controlled by the cam nose 262 of trigger 252 engaging the lever 172 immediately prior to movement of door 46 to a fully closed position to swing lever 176 downwardly within slot 180 and in turn move link 106 and lever 208 downwardly by means of the engagement of the lever 176 with shoulder 220 of lever 208. Similarly, movement of the strip to a retracted or upper position is controlled by the trigger 252 engaging lever 188 so as to cause this lever to swing lever 208 out of engagement with lever 176 immediately upon opening movement of door 46 so that springs 90 will positively move the outer strip to an upper or retracted position.

Thus, this invention provides a finish molding for vehicle bodies of the type including a swingable door and a door header movable between open and closed positions. The finish molding includes the outer strip which is slidable relative to a fixed inner strip so as to be moved between an upper or retracted position and a lower or extended position. In the lower position of the strip, it cooperates with the fixed strip in providing a glass receiving channel for the door window. The movement of the outer strip between its upper and lower positions is coordinated with the movement of the door so that the strip will be immediately moved to a retracted position simultaneously with initial opening movement of the door and will also be immediately moved to an extended position immediately prior to movement of the door to a fully closed position.

Thus, the finish molding of this invention solves the problem of providing both a finish molding and a glass receiving channel for an automobile body having no door window structure above the belt line.

We claim:

1. A molding arrangement for automobile bodies of the type including a door movable to open and closed positions with respect to a vehicle body and a door window moving generally vertically between open and closed positions with respect to a body door header comprising, a first strip depending from said header, a second vertically disposed strip located in spaced relationship to said first strip, said second strip having actuating means secured thereto, means mounting said second strip on said header for generally vertical movement between an extended position with respect to said header and in opposition to said first strip and a retracted position with respect to said header and out of opposition to said first strip, means urging said second strip to said retracted position thereof, and means operatively connected to said second strip actuating means and being located on said body and said door engageable by closing operation of said door for moving said second strip to said extended position against the action of said urging means, wherein said second strip cooperates with said first strip in providing a glass receiving channel for said window.

2. A molding arrangement for automobile bodies of the type including a door movable to open and closed positions with respect to a vehicle body and a door window moving generally vertically between open and closed positions with respect to a body door header comprising, a first strip depending from said header, a plurality of levers swingably supported by said header, a second strip supported by said levers in outwardly spaced relationship to said first strip for movement between a first position in opposition thereto and a second position out of opposition thereto upon swinging movement of said levers, resilient means biasing said second strip to said second position thereof, operating means interconnecting said levers for swinging movement thereof, and means mounted on said body and said door operatively connected to said operating means and engageable by operation of said door as said door is closed for swinging said levers against the action of said resilient means to move said second strip to said first position thereof wherein said second strip cooperates with said first strip in providing a glass receiving channel for said window.

3. A molding arrangement for automobile bodies of the type including a door movable to open and closed positions and a door window moving generally vertically between open and closed positions with respect to a body door header comprising, a first strip depending from said header, a second vertically disposed strip located in spaced relationship to said first strip, means mounting said second strip on said header for generally vertical movement between a first position in opposition to said first strip and a second position out of opposition thereto, means urging said second strip to said second position thereof, operating means operatively connected to said strip for moving said strip to said first position thereof, a movable detented member operatively connected to said operating means, a detent engageable with said detented member for moving said member to thereby cause said operating means to move said second strip to said first position thereto, and means engageable with said detent as said door is closed to move said detent and detented member whereby said operating means moves said second strip to said first position thereof wherein said second strip cooperates with said first strip to provide a glass receiving channel for said window.

4. A molding arrangement for automobile bodies of the type including a door movable to open and closed positions and a door window moving generally vertically between open and closed positions with respect to a body door header comprising, a first strip depending from said header, a plurality of bell crank levers swingably supported by said header, a second strip pivotally and slidably secured to one leg of said levers and located in outwardly spaced relationship to said first strip for movement between a first position in opposition thereto and a second position out of opposition thereto upon swinging movement of said levers, resilient means biasing said second strip to said second position thereof, a plurality of links pivotally interconnecting the other legs of said levers for simultaneous swinging movement thereof, and means operatively connected to said links and engageable by said door as said door is closed for swinging said levers against the action of said resilient means to move said second strip to said first position thereof and hold said strip in said first position thereof while said door remains closed whereby said second strip cooperates with said first strip in providing a glass receiving channel.

5. A molding arrangement for automobile bodies of the type including a door movable to open and closed positions and a door window moving generally vertically between open and closed positions with respect to a body door header comprising, a first strip depending from said header, a lever swingably supported by said header, a second strip supported by said lever in outwardly spaced relationship to said first strip for movement between a first position in opposition thereto and a second position out of opposition thereto upon swinging movement of said lever, a movable detented member connected to said lever, a detent engageable with said detented member for movement thereof to thereby swing said lever and move said second strip to said first position thereof, and means on said door engageable with said detent as said door is closed to swing said lever and move said second strip to said first position thereof to cooperate with said first strip in providing a glass receiving channel for said window.

6. A molding arrangement for automobile bodies of the type including a door movable to open and closed positions and a door window moving generally vertically between open and closed positions with respect to a body door header comprising, a first strip depending from said header, a lever swingably supported by said header, a second strip supported by said lever in outwardly spaced relationship to said first strip for movement between a first position in opposition thereto and a second position out of opposition thereto upon swinging movement of said lever, means biasing said second strip to said second position thereof, a movable detented member connected to said lever, a detent engageable with said detented member for movement thereof to thereby swing said lever, means on said door engageable with said detent as said door is closed to swing said lever and move said second strip to said first position thereof to cooperate with said first strip in providing a glass receiving channel for said window, and means engageable by said door as said door is opened for moving said detented member out of engagement with said detent to allow said biasing means to move said second strip to said second position thereof.

7. A molding arrangement for automobile bodies of the type including a door movable to open and closed positions and a door window moving generally vertically between open and closed positions with respect to a body door header comprising, a first strip depending from said header, a lever swingably supported by said header, a second strip supported by said lever in outwardly spaced relationship to said first strip for movement between a first position in opposition thereto and a second position out of opposition thereto upon swinging movement of said lever, resilient means operatively connected to said lever for swinging movement thereof to move said second strip to said second position thereof, a movable detented member connected to said lever, a detent engageable with said detented member for movement thereof to thereby swing said lever, means on said door engageable with said detent as said door is closed to swing said lever and move said second strip to said first position thereof to cooperate with said first strip in providing a glass receiving channel for said window, and means engageable by said door as said door is opened for moving said detented member out of engagement with said detent to allow said resilient means to swing said lever and thereby move said second strip to said second position thereof.

8. A molding arrangement for automobile bodies of the type including a door movable to open and closed positions and a door window moving generally vertically between open and closed positions with respect to a body door header comprising, a first strip depending from said header, a plurality of levers swingably supported by said header, a second strip supported by said levers in outwardly spaced relationship to said first strip for movement between a first position in opposition thereto and a second position out of opposition thereto upon swinging movement of said levers, resilient means biasing said second strip to said second position thereof, operating means interconnecting said levers for simultaneous swinging movement thereof, a movable detented member connected to said operating means for swinging said levers to move said second strip to said first position thereof, a detent engageable with said detented member for movement thereof to thereby swing said levers, means on said door engageable with said detent as said door is closed to swing said levers and move said second strip to said first position thereof to cooperate with said first strip in providing a glass receiving channel for said window, and means engageable by said door as said door is opened for moving said detented member out of engagement with said detent to allow said resilient means to move said second strip to said second position thereof.

9. A molding arrangement for automobile bodies of the type including a door movable to open and closed positions and a door window moving generally vertically between open and closed positions with respect to a body door header comprising, a first strip depending from said header, a plurality of levers swingably supported by said header, a second strip supported by said levers in outwardly spaced relationship to said first strip for movement between a first position in opposition thereto and a second position out of opposition thereto upon swinging movement of said levers, resilient means swinging said levers to bias said second strip to said second position thereof, a plurality of links pivotally interconnecting said levers for simultaneous swinging movement thereof upon shifting movement of said links, a movable detented member connected to said links, a detent engageable with said detented member for movement thereof to thereby shift said links and swing said levers, means on said door engageable with said detent as said door is closed for shifting said detented member to thereby move said second strip to said second position thereof to cooperate with said first strip in providing a glass receiving channel for said window, and lever means engageable by said door as said door is opened for swinging movement thereof into engagement with said detented member to move said member out of engagement with said detent and allow said resilient means to swing said levers and thereby move said second strip to said second position thereof.

References Cited in the file of this patent

UNITED STATES PATENTS

| | | |
|---|---|---|
| 1,963,819 | Yates | June 19, 1934 |
| 2,575,459 | Moten | Nov. 20, 1951 |
| 2,631,887 | Wernig | Mar. 17, 1953 |